(12) United States Patent
Kapoor

(10) Patent No.: US 9,960,769 B2
(45) Date of Patent: May 1, 2018

(54) POWER-DOMAIN OPTIMIZATION

(71) Applicant: NXP B.V., Eindhoven (NL)

(72) Inventor: Ajay Kapoor, Eindhoven (NL)

(73) Assignee: NXP B.V., Eindhoven (NL)

( * ) Notice: Subject to any disclaimer, the term of this patent is extended or adjusted under 35 U.S.C. 154(b) by 203 days.

(21) Appl. No.: 14/973,616

(22) Filed: Dec. 17, 2015

(65) Prior Publication Data

US 2017/0179957 A1 Jun. 22, 2017

(51) Int. Cl.
*H03K 19/0175* (2006.01)
*G06F 1/26* (2006.01)
*G05F 3/02* (2006.01)

(52) U.S. Cl.
CPC ....... *H03K 19/017509* (2013.01); *G05F 3/02* (2013.01); *G06F 1/26* (2013.01)

(58) Field of Classification Search
CPC ...... H03K 19/017509; G05F 3/02; G05F 1/26
USPC .................. 327/306, 333; 326/61–62, 80–81
See application file for complete search history.

(56) References Cited

U.S. PATENT DOCUMENTS

| | | | |
|---|---|---|---|
| 5,867,040 A | 2/1999 | Fuse et al. | |
| 6,479,974 B2 | 11/2002 | Cohn et al. | |
| 6,759,872 B2 | 7/2004 | Lai et al. | |
| 7,329,968 B2 | 2/2008 | Shepard et al. | |
| 7,594,208 B1 | 6/2009 | Borer et al. | |
| 7,551,985 B1 | 9/2009 | Chen et al. | |
| 7,982,498 B1 * | 7/2011 | Chen | H03K 3/35613 326/21 |
| 7,984,317 B2 | 7/2011 | Conroy et al. | |
| 8,200,990 B2 | 6/2012 | Dishman et al. | |
| 8,339,177 B2 | 12/2012 | Jarrar et al. | |
| 8,476,962 B2 | 7/2013 | Pelley | |
| 8,878,387 B1 | 11/2014 | Wong et al. | |
| 8,957,778 B2 | 2/2015 | Adams et al. | |
| 2006/0119390 A1 | 6/2006 | Sutardja | |
| 2007/0011643 A1 | 1/2007 | Wang et al. | |
| 2010/0259299 A1 | 10/2010 | Dennard et al. | |
| 2012/0054511 A1 | 3/2012 | Brinks et al. | |
| 2012/0187998 A1 * | 7/2012 | Jarrar | H03K 19/018521 327/333 |
| 2013/0154712 A1 | 6/2013 | Hess et al. | |
| 2014/0340142 A1 | 11/2014 | Wong et al. | |
| 2015/0346742 A1 | 12/2015 | Kapoor et al. | |

OTHER PUBLICATIONS

Notice of Allowance for U.S. Appl. No. 15/019,384; 15 pages (dated Dec. 21, 2016).

(Continued)

*Primary Examiner* — Dinh T Le

(57) ABSTRACT

One example discloses an apparatus for power management, including: a circuit having a first power-domain and a second power-domain; wherein the first and second power-domains include a set of operating parameter values; a circuit controller configured to incrementally sweep at least one of the operating parameter values of the first power-domain; a circuit profiler configured to derive a total power consumption profile of the circuit based on the circuit's response to the swept operating parameter value; wherein the circuit controller sets the operating parameter values for the first and second power-domains based on the total power consumption profile of the circuit.

13 Claims, 8 Drawing Sheets

(56) References Cited

OTHER PUBLICATIONS

"A Practical Guide To Low-Power Design"; retrieved from the Internet https://www.si2.org/.../PowerForward/LowPowerGuide09232009/.../lpg on Nov. 18, 2015; 110 pages. (Jun. 5, 2009).

"Lecture 13—Digital Circuits (III), CMOS Circuits"; 17 pages; Spring 2007.

Andersen, Toke M. et al; "A 4.6 W/mm2 Power Density 86% Efficiency On-Chip Switched Capacitor DC-DC Converter in 32 nm SOI CMOS"; Twenty-Eighth Annual IEEE Applied Power Electronics Conference and Exposition, Long Beach, CA, USA; pp. 692-699 (Mar. 2013).

Hwang, Sanghoon et al; "Velocity Saturation Effects in a Short Channel Si-MOSFET and its Small Signal Characteristics"; Journal of the Korean Physical Society, vol. 55, No. 2; pp. 581-584 (Aug. 2009).

Lee, Sae Kyu et al; "A 16-core voltage-stacked system with an integrated switched-capacitor DC-DC converter"; 2015 Symposium on VLSI Circuits Digest of Technical Papers; 2 pages (2015).

Lee, Sae Kyu et al; "Evaluation of Voltage Stacking for Near-Threshold Multicore Computing"; ISLPED' 12, Redondo Beach, CA, USA, pp. 373-378 (Aug. 2012).

Liu, Yong et al; "A 0.1pJ/b 5-to-10Gb/s Charge-Recycling Stacked Low-Power I/O for On-Chip Signaling in 45nm CMOS SOI"; IEEE ISSCC 2013/SESSION 23/Short-Reach Links, XCVR Techniques, & PLLS; pp. 400-402 (Feb. 20, 2013).

NXP, B.V., Kapoor, A.; "Configurable Power Domain and Method"; U.S. Appl. No. 14/794,485, filed Jul. 8, 2015; 32 pages.

NXP, B.V.; Blutman, K.L. et al; U.S. Appl. No. 14/804,411, filed Jul. 8, 2015, "Level Shifter and Approach Therefor"; 33 pages.

Rajapandian, Saravanan et al; "High-Voltage Power Delivery Through Charge Recycling"; IEEE Journal of Solid-State Circuits, vol. 41, No. 6; pp. 1400-1010 (Jun. 2006).

Schaef, Christopher et al; "Efficient Voltage Regulation for Microprocessor Cores Stacked in Vertical Voltage Domains"; IEEE Transactions on Power Electronics, vol. 31, No. 2; pp. 1795-1808 (Feb. 2016).

Ueda, Kazuhiro et al; "Low-Power On-Chip Charge-Recycling DC-DC Conversion Circuit and System"; IEEE Journal of Solid-State Circuits, vol. 48, No. 11; pp. 2608-2617; (Nov. 2013).

NXP, B.V.; Kapoor et al; "Configurable Power Domain and Method" U.S. Appl. No. 14/794,485, not yet published; 32 pages (filed Jul. 8, 2015).

NXP, B.V.; Kapoor, Ajay; "Power-Domain Current Balance"; U.S. Appl. No. 14/973,575, 31 pages (filed Dec. 17, 2015).

\* cited by examiner

WHERE:
IA0 = 1
IA0 = 2
VDDA0 = 0.7
VDDB0 = 1
Vth = 0.4
TA0 = 1
TB0 = 0.1

WHERE:
IA0 = 1
IA0 = 2
VDDA0 = 0.7
VDDB0 = 1
Vth = 0.4
TA0 = 1
TB0 = 0.7

POWER-DOMAIN OPTIMIZATION

INCORPORATION BY REFERENCE UNDER 37CFR § 1.57

The specification herein incorporates by reference a to be published U.S. patent application Ser. No. 14/973,575 filed on Dec. 17, 2015.

The present specification relates to systems, methods, apparatuses, devices, articles of manufacture and instructions for power management.

Circuit designs can often be partitioned into multiple power-domains. Depending upon the partitioning, either flat power-domains having multiple supply voltages (MSV) or stacked power-domains employing charge recycling can be created.

Partitioning and assigning voltages to each of these power-domains however can be a complex, costly and time consuming process, requiring extensive infrastructure support.

Power consumption of such partitioned circuits is often not optimal and can drain batteries and/or unnecessarily increase electrical consumption.

SUMMARY

According to an example embodiment, an apparatus for power management, comprising: a circuit having a first power-domain and a second power-domain; wherein the first and second power-domains include a set of operating parameter values; a circuit controller configured to incrementally sweep at least one of the operating parameter values of the first power-domain; and a circuit profiler configured to derive a total power consumption profile of the circuit based on the circuit's response to the swept operating parameter value; wherein the circuit controller sets the operating parameter values for the first and second power-domains based on the total power consumption profile of the circuit.

In another example embodiment, the set of operating parameters include at least one of: an operating voltage, an operating current, an operating delay time, an operating frequency or an operating task.

In another example embodiment, the circuit controller sets the operating voltage values for the first and second power-domains to minimize at least one of: a total circuit current, the total power consumption of the circuit or a total circuit delay.

In another example embodiment, the incremental sweep is performed in real-time during circuit operation.

In another example embodiment, the power-domains are configured in at least one of: a flat configuration or a stacked configuration.

In another example embodiment, the circuit controller is an adaptive-relative-voltage-frequency-scaling (ARVFS) controller.

In another example embodiment, VDDA is an operating voltage and IA is an operating current for the first power-domain; VDDB is an operating voltage and IB is an operating current for the second power-domain; k1=IA/VDDA, k2=IB/VDDB; and the circuit profiler configured to derive the total power consumption profile based on equation: I-total=k1*VDDA+k2*VDDB.

In another example embodiment, the circuit profiler configured to derive a total timing delay profile of the circuit based on the circuit's response to the incremental sweep of the operating parameter value; and the circuit controller also sets the operating parameter values for the first and second power-domains based on the total timing delay profile of the circuit.

In another example embodiment, VDDA is an operating voltage for the first power-domain, and VDDB is an operating voltage for the second power-domain; TA is an operating delay time for the first power-domain and TB is an operating delay time for the second power-domain; Vth is a threshold voltage and 'α' is velocity saturation index; m1=TA*(VDDA−Vth)$^\alpha$/VDDA, and m2=TB*(VDDB−Vth)$^\alpha$/VDDB; and the circuit profiler configured to derive the total timing delay profile based on equation: Tcritical=m1*VDDA/(VDDA−Vth)$^\alpha$+m2*VDDB/(VDDB−Vth)$^\alpha$.

In another example embodiment, further comprising a set of level-shifters for translating a set of signals exchanged between the first power-domain and the second power-domain; the circuit controller positions the level-shifters at a first set of locations in the circuit; the circuit profiler is configured to derive a first total power consumption profile of the circuit with the set of level-shifters positioned at the first set of locations; the circuit controller positions the level-shifters at a second set of locations in the circuit; the circuit profiler is configured to derive a second total power consumption profile of the circuit with the set of level-shifters positioned at the second set of locations; and the circuit controller the set of level-shifter locations based on the total power consumption profile of the circuit.

In another example embodiment, the circuit controller the set of level-shifter locations such that the total power consumption of the circuit is minimized.

According to another example embodiment, a method for power management in a circuit having a first power-domain and a second power-domain, wherein the first and second power-domains include a set of operating parameter values, the method comprising: incrementally sweep at least one of the operating parameter values of the first power-domain; deriving a total power consumption profile of the circuit based on the circuit's response to the swept operating parameter value; and setting the operating parameter values for the first and second power-domains based on the total power consumption profile of the circuit.

According to yet another example embodiment, an article of manufacture includes at least one non-transitory, tangible machine readable storage medium containing executable machine instructions for power management, comprising: wherein the article includes, a circuit having a first power-domain and a second power-domain; wherein the first and second power-domains include a set of operating parameter values; wherein the instructions include, incrementally sweep at least one of the operating parameter values of the first power-domain; deriving a total power consumption profile of the circuit based on the circuit's response to the swept operating parameter value; and setting the operating parameter values for the first and second power-domains based on the total power consumption profile of the circuit.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
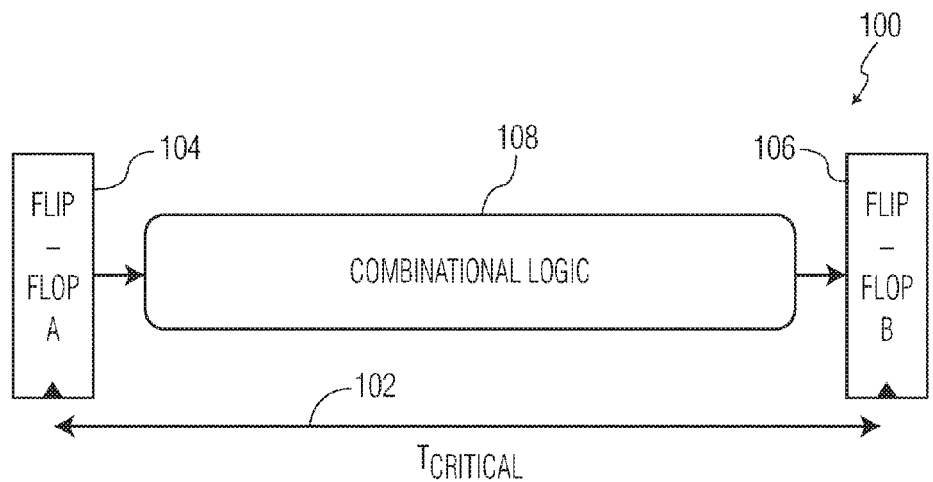
FIG. 1 is one example of a dataflow and timing diagram of a critical path delay in a circuit design with or without power-domain partitioning.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are design and control techniques for partitioning circuit designs into multiple power-domains and then assigning both nominal and real-time voltages to each of such power-domains.

These techniques can be applied to any number of flat or stacked power-domains, or some combination of flat and stacked power-domains.

The techniques discussed below can be applied both at the design phase and during the dynamic real-time operational circuit control phase. Techniques at design phase can also be incorporated into design flow and algorithms for EDA tools.

During the design phase (i.e. initial design optimization) optimal partitioning of the power-domains (i.e. positioning of the inter-domain signal level-shifters), and optimal assignment of nominal power-domain voltages is performed.

During the real-time operational phase optimal dynamic power-domain voltage assignments are made using a software or embedded hardware controller for voltage, frequency and/or task scaling Tasks are herein defined to include a set of logical operations, a set of software instructions, or other activities performed by at least one of the power-domains. In one example embodiment, the controller is an adaptive-relative-voltage-frequency-scaling (ARVFS) controller.

In one example embodiment, the operational phase optimization techniques are embedded in hardware, while in another example embodiment these techniques are implemented using computerized software. Dynamic Voltage and Frequency Scaling (DVFS) techniques may be used in other example embodiments.

While the discussion below is presented with respect to voltage assignments for multiple power-domains, the optimization algorithms can also be extended to tune the substrate biasing in design and applications.

FIG. 1 is one example dataflow and timing diagram 100 of a critical path delay 102 (i.e. Tcritical) in a circuit design with or without power-domain partitioning.

The speed of a digital circuit design is characterized by its register-to-register delay (i.e. critical path delay 102). Tcritical 102 is determined by the speed at which data can be transferred between two registers/flip-flops 104 and 106. Tcritical is increased by combinational logic 108 between the registers/flip-flops 104, 106.

Figure 2:
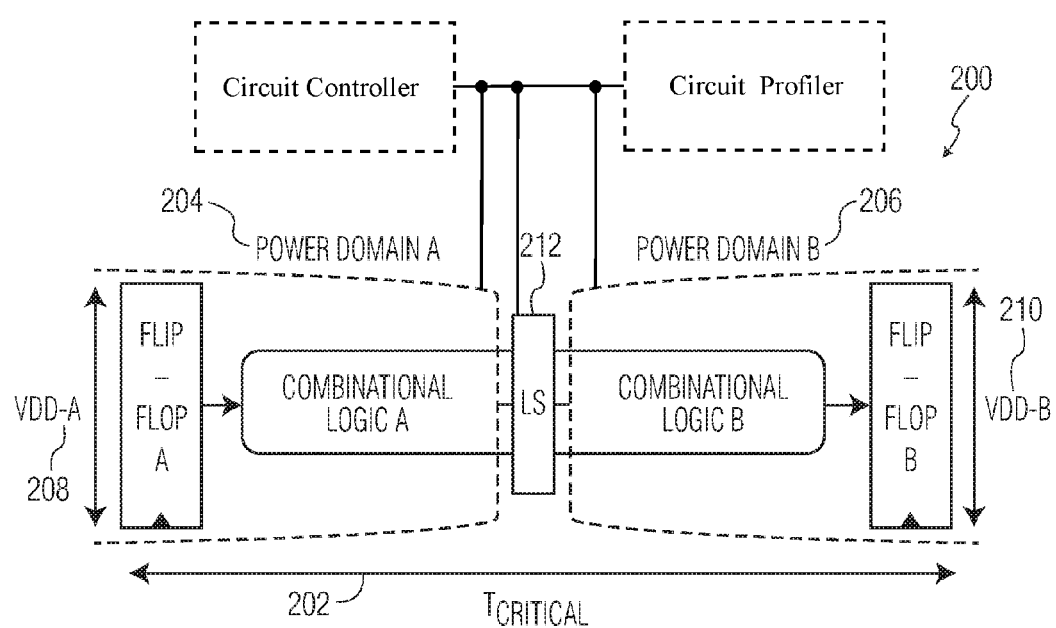
FIG. 2 is one example dataflow and timing diagram of a critical path delay in a flat partitioned power-domain design.

FIG. 2 is one example dataflow and timing diagram 200 of a critical path delay 202 (i.e. Tcritical) in a multiple supply voltage (MSV) partitioned power-domain design (also called flat design from here onwards in this document). In this example with multiple supply voltage (MSV) (i.e. flat) design, the Tcritical path crosses two power domains (e.g. power-domain A 204 and power-domain B 206). Each power-domain has its own voltage rails (i.e. VDDA 208 and VDDB 210).

When the power-domain's voltage levels (VDDA, VDDB) are different, circuit signals transmitted between the two power-domains need to be translated (i.e. level-shifted) using signal voltage level-shifters 212.

Here assuming that such level-shifters 212 have negligible overhead timing delay and power requirements as compared to the overall flat design, then:

$$T\text{critical} = TA + TB \qquad \text{Eqn. 1}$$

where, $T_A$ and $T_B$ are timing delays contribution of critical timing path in each power-domain A and B respectively.

Total current (Itotal) consumed in this flat power-domain design equals a sum of currents consumed in each power-domain A and B.

$$I\text{total} = IA + IB \qquad \text{Eqn 2}$$

Thus for a flat power-domain design, power consumption optimization is based on the total current consumed by the power-domain A and power-domain A (i.e. IA+IB).

Figure 3:
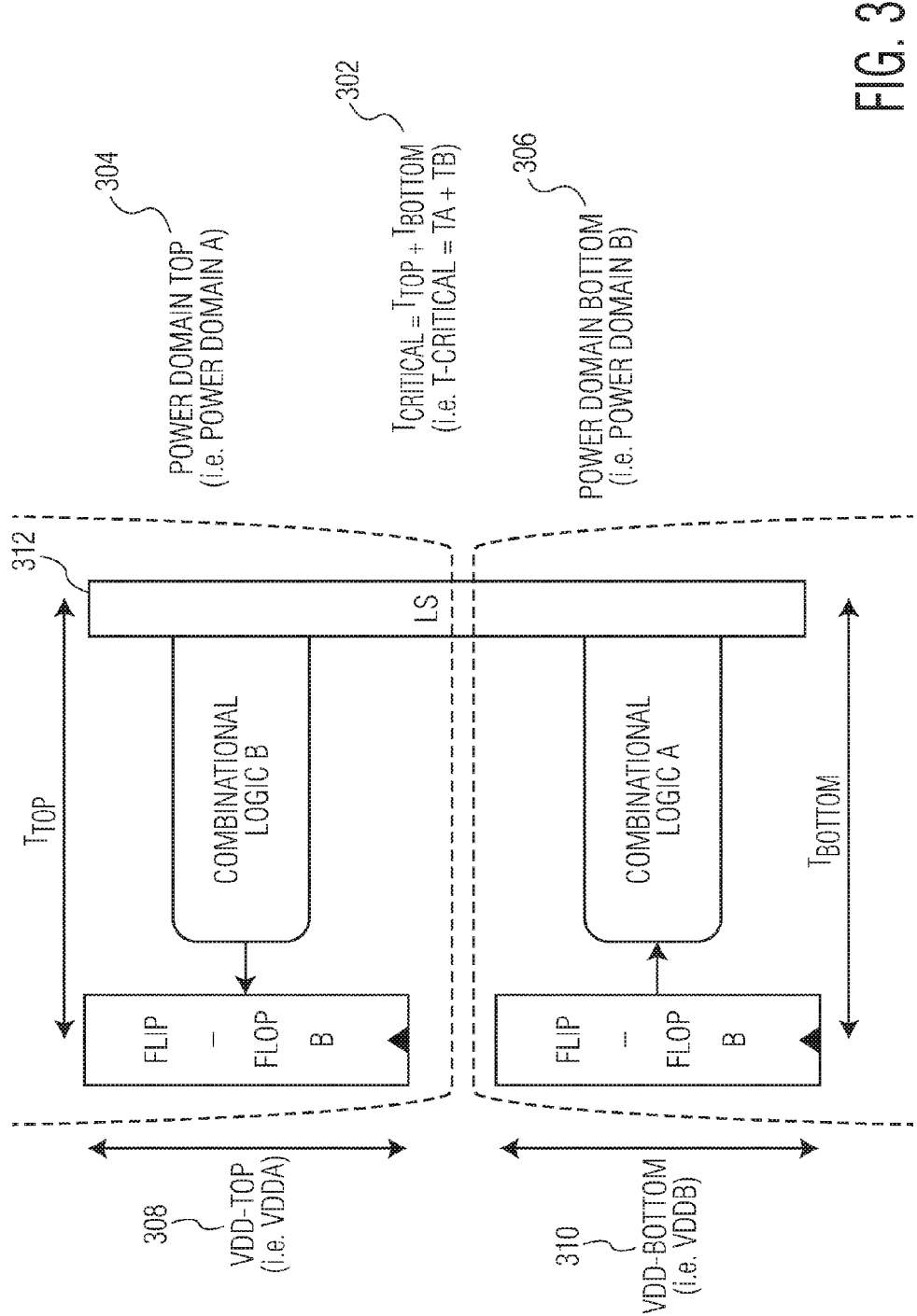
FIG. 3 is one example dataflow and timing diagram of a critical path delay in a stack partitioned power-domain design.

FIG. 3 is one example dataflow and timing diagram 300 of a critical path delay 302 in a stack partitioned power-domain design.

In a stacked power-domain design, the current consumed from the power supply is the maximum current of either power-domain (i.e. MAX of either Itop or Ibottom or MAX of either IA or IB).

For the purposes of this discussion "power-domain top 304" is the same as "power-domain A" and "power-domain bottom 306" is the same as "power-domain B". Voltage VDD-top 308 is assigned to power-domain top 304 and voltage VDD-bottom 310 is assigned to power-domain bottom 306. A set of level-shifters 312 interface signals transiting between the top and bottom power-domains.

For the stacked power-domain design, one example of power consumption optimization is based on minimizing the maximum value of Itop and Ibottom.

Thus, Eqns. 1 and 2 are rewritten as follows:

$$I\text{total} = \text{MAX}(IA/I\text{top}, IB/I\text{bottom}) \qquad \text{Eqn. 3; or}$$

$$T\text{critical} = TA/T\text{top} + TB/T\text{bottom} \qquad \text{Eqn. 4}$$

Figure 4:
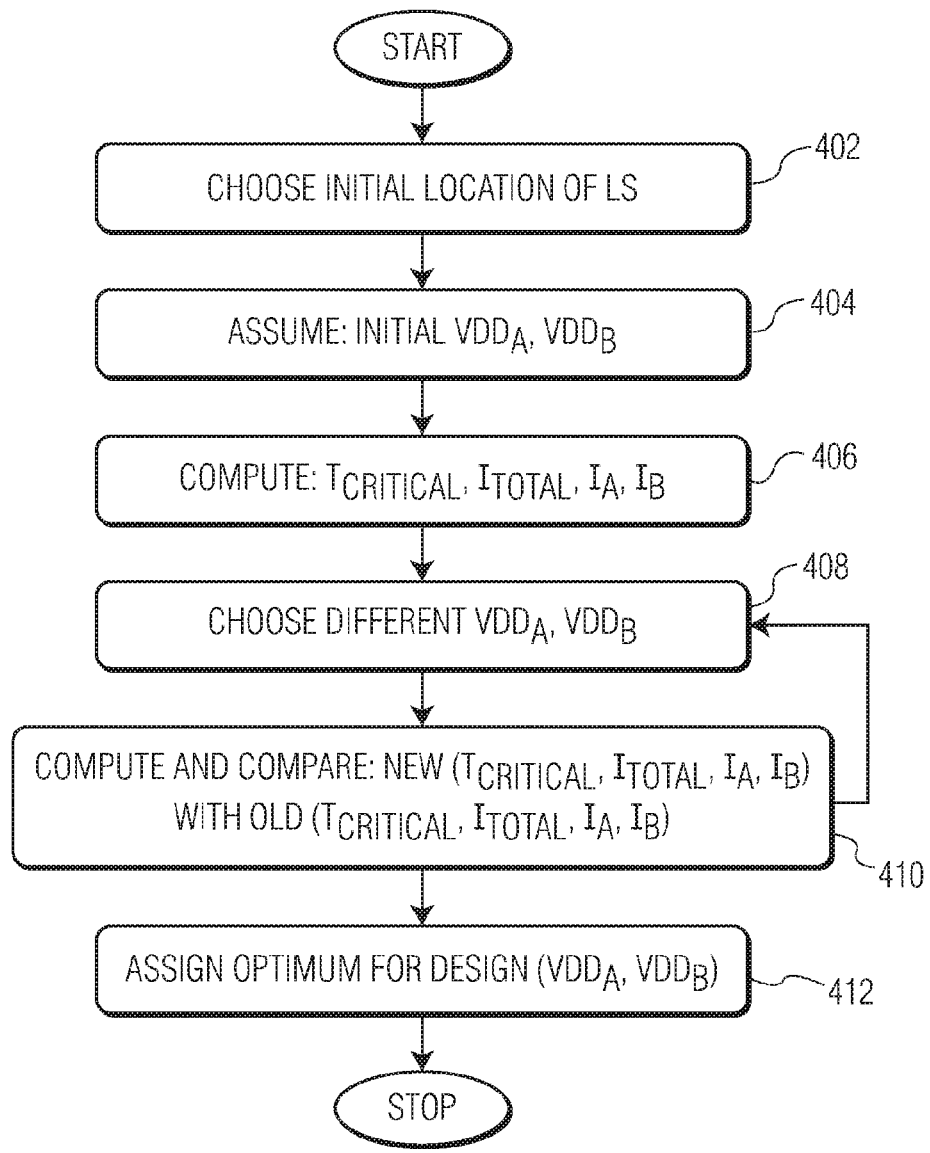
FIG. 4: is first example set of instructions for enabling power-domain optimization.

FIG. 4: is a first example set of instructions for enabling power-domain optimization. In this first example, Tcritical and Itotal are minimized for either a flat or stacked power-domain design using nominal voltage scaling.

The order in which the instructions are discussed does not limit the order in which other example embodiments implement the instructions unless otherwise specifically stated. Additionally, in some embodiments the instructions are implemented in parallel.

In 402, the circuit is partitioned into a set of power-domains. This is part of the design phase (i.e. the design exploration phase), whereby an initial set of locations for the voltage level-shifters (LS) is chosen.

In one example, the level-shifters are located at the boundary of specific IP-blocks and/or subsystems, (e.g. at a boundary between a high speed subsystem and a low speed subsystem).

In an example MCU based design, the boundaries can be located between a memory subsystem, which operates at a lower voltage, and a CPU or other logic subsystem which operates at a higher voltage or vice-versa (Generally, memory is at higher voltage than logic/CPU, since memory voltages do not scale as much as logic voltages).

A technique for minimizing timing and current overhead associated with such level-shifters is by minimizing the number of level-shifter-cells.

In 404, an initial set of nominal power supply voltages for the set of power-domains is selected.

In 406, a circuit profiler (e.g. circuit logic, a microcontroller or a computer) computes Tcritical, Itotal, IA (power-domain A current) and IB (power-domain B current) are computed. In one example, this computation is done using a set of infrastructure components (e.g. libraries containing timing and power information). In some instances, the financial costs for generation and supporting such infrastructure components are significant and certain support teams and additional tools are required. Depending upon these libraries, the infrastructure components supported may be limited to only a few power-domain voltages (e.g. VDDA and VDDB), and circuit design closure may require additional manual input from a design team.

In 408, a different set of nominal power supply voltages for the set of power-domains is selected.

In 410, the computation described in 406 is performed using this different set of nominal power supply voltages. These newer (i.e. instruction 410) set of computations are then compared with the prior (i.e. instruction 406) set of computations.

Iterations between instructions 408 and 410 are performed until the circuit is optimized by minimizing total circuit power consumption (i.e. minimizing either Tcritical or Itotal or both, as shown in Eqn. 5A or 5B).

$$\text{Minimize } I\text{total for a constant } T\text{critical} \qquad \text{Eqn. 5A}$$

$$\text{Minimize } T\text{critical for a constant } I\text{total} \qquad \text{Eqn. 5B}$$

In 412, a final set of nominal power supply voltages are assigned to the set of power-domains.

Figure 5:
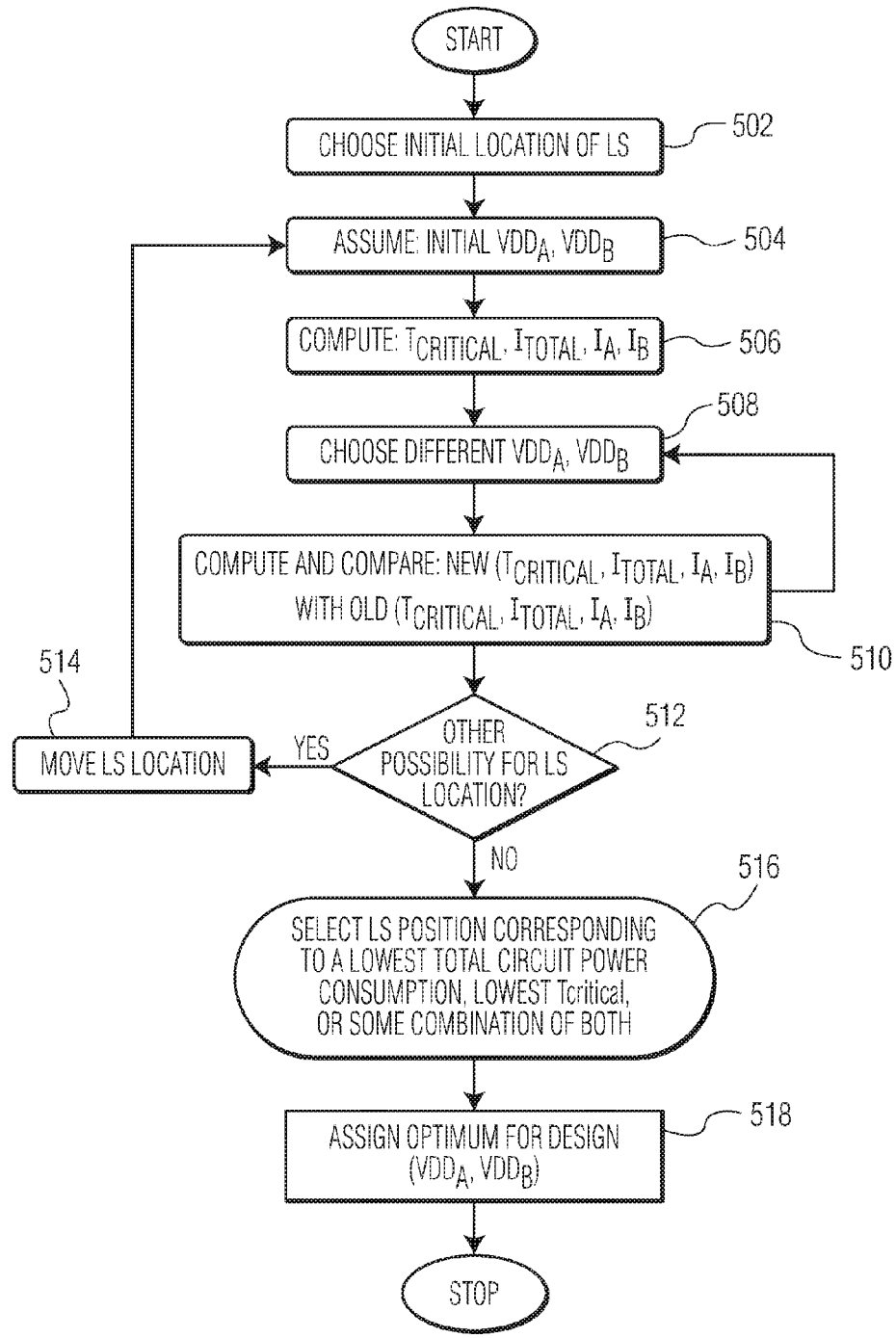
FIG. 5: is second example set of instructions for enabling power-domain optimization.

FIG. 5: is a second example list of instructions for enabling power-domain optimization. In this second example, Tcritical and Itotal are minimized for either a flat or stacked power-domain design using variable partitioning (i.e. changing locations of one or more signal level-shifters) and nominal voltage scaling.

The order in which the instructions are discussed does not limit the order in which other example embodiments implement the instructions unless otherwise specifically stated. Additionally, in some embodiments the instructions are implemented in parallel.

Instructions 502, 504, 506, 508 and 510 are similar to instructions 402, 404, 406, 408 and 410 discussed earlier.

Next in 512, a check is made whether there is another possible set of level-shifter (LS) locations.

If another set of level-shifter locations is possible, in 514 the level-shifters are logically moved using EDA design tools to such other location and instructions 504, 506, 508 and 510 are repeated.

In 512 if there are no other possible set of level-shifter locations, then in 516 the set of level-shifter positions corresponding to either a lowest total circuit power consumption, a lowest Tcritical, or some combination of both is selected.

In 518 a final set of nominal power supply voltages are assigned to the set of power-domains corresponding to the selected set of level-shifter positions.

Example instances of this design methodology also rely on the infrastructure components limitations mentioned earlier and are subject to similar limitations. Also, in some examples, this design methodology may only optimize the power consumption within individual power-domains instead of for the entire circuit. For example, in some instances these techniques will either scale the voltage of all power-domains equally or scale only one of the power-domains.

Figure 6:
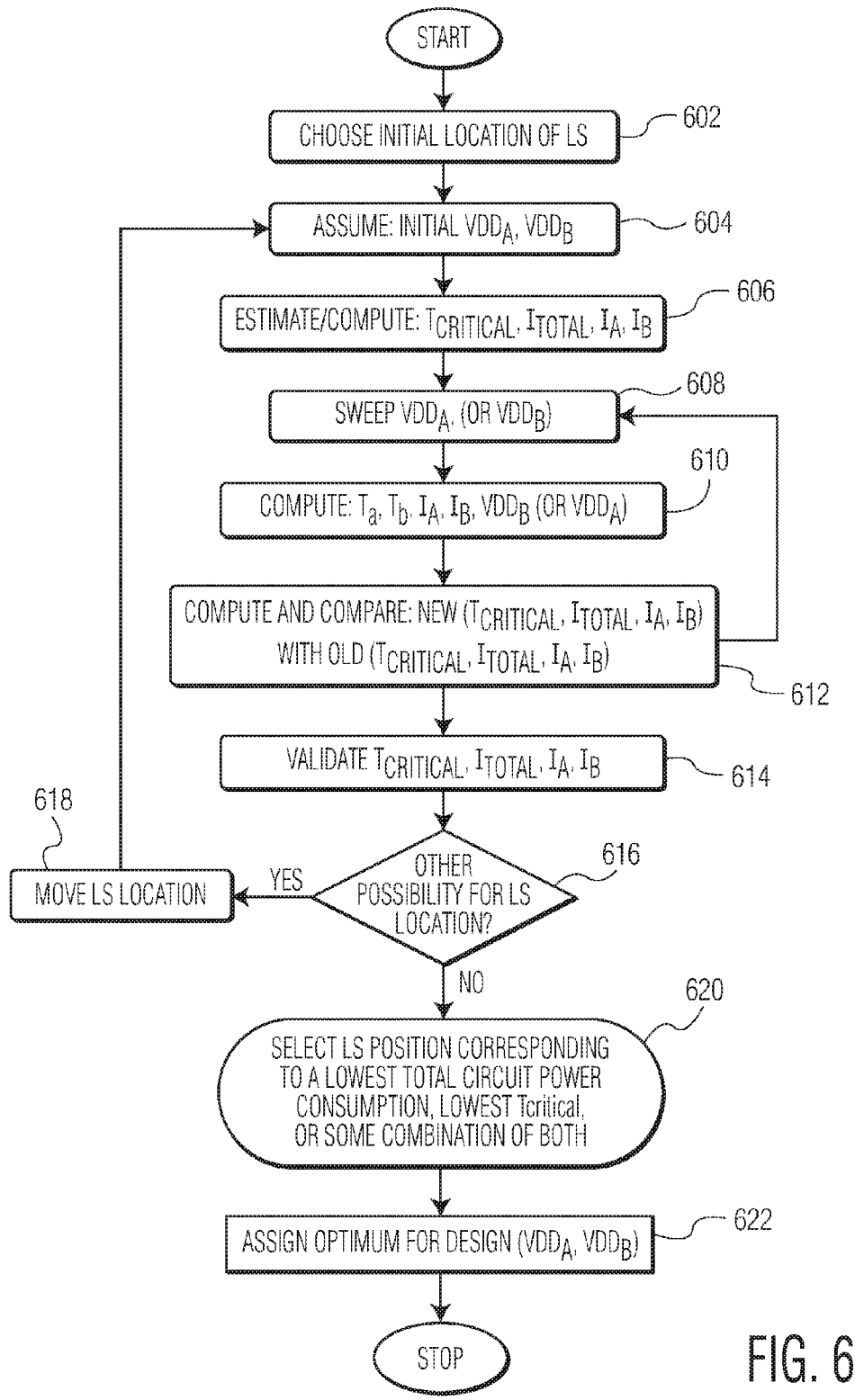
FIG. 6: is third example set of instructions for enabling power-domain optimization.

FIG. 6: is a third example list of instructions for enabling power-domain optimization. In this third example, Tcritical and Itotal are minimized for either a flat or a stacked power-domain design using variable partitioning and both nominal and real-time voltage scaling. Thus these algorithms can be applied both during both the design phase as well as during the real-time dynamic operational phase.

The order in which the instructions are discussed does not limit the order in which other example embodiments implement the instructions unless otherwise specifically stated. Additionally, in some embodiments the instructions are implemented in parallel.

Unlike the infrastructure components (e.g. libraries containing timing and power information) used in FIG. 4 and FIG. 5 above, an alternative simpler and faster approach to estimating/computing Tcritical, Itotal, IA and IB is now presented. This simpler and faster approach enables real-time voltage scaling in response to dynamic changes as the circuit operates.

To start, Eqns. 6 and 7 are used to represent delay and current consumption in a digital system.

$$\text{Delay}(T) = K*VDD/(VDD-Vth)^\alpha \qquad \text{Eqn. 6}$$

In Eqn 6, "Vth" is threshold voltage, "K" is a proportionality constant and 'α' is velocity saturation index (1<α<2). For <90 nm, α→1.3

$$\text{Current}(I) = a*C*VDD*f \qquad \text{Eqn. 7}$$

In Eqn 7, 'a': activity, 'C': intrinsic capacitance, 'VDD': Voltage and 'f': frequency. Note, Vth is threshold voltage, 90 nm refers to CMOS technology (i.e. gate length). Dynamic power (e.g. switching power) is a power dissipated while charging and discharging the capacitive load at the outputs of each CMOS logic cell whenever a transition occurs. Historically, the dynamic power has been a dominant component of power dissipation, expressed as:

$$P\_dynamic = \tfrac{1}{2}*a*f*VDD*VDD*C \qquad \text{Eqn. 7-2}$$

Where, 'a' is the average number of output transitions in each clock period. It is usually less than 1, and so is often also defined as the probability of an output transition in a clock period; f is the clock frequency; C is the load capacitance. This can be extended for SOC where, 'a' is related with the average switching activity; C is total intrinsic capacitance of digital (switching part e.g. CPU). Eqn. 7 can be derived by dividing the power dissipation with voltage and merge ½ also into 'a'.

Based on the above equations, Tcritical can be written as Eqns. 8.

$$T\text{critical}=m1*VDDA/(VDDA-Vth)^\alpha+m2*VDDB/(VDDB-Vth)^\alpha \quad \text{Eqn. 8.}$$

In Eqn 8, m1, m2 are proportionality constants based on design realization.

$$m1=TA*(VDDA-Vth)^\alpha/VDDA \quad \text{Eqn. 9}$$

$$m2=TB*(VDDB-Vth)^\alpha/VDDB \quad \text{Eqn. 10}$$

Based on the above equations, Itotal can be written as Eqns. 11.

$$I\text{total}=k1*VDDA+k2*VDDB \quad \text{Eqn. 11}$$

In Eqn 11, k1, k2 are proportionality constants based on the circuit design and an assumption that each power-domain will operate at fixed frequency.

$$k1=IA/VDDA \quad \text{Eqn. 12}$$

$$k2=D3/VDDB \quad \text{Eqn. 13}$$

Eqns. 8 and 11 are used to optimize overall system performance, during either the design phase or the real-time operational phase, and use fewer computational resources and fewer or none of the infrastructure components than the approach described in FIGS. 4 and 5.

In 602, the circuit is partitioned into an initial set of power-domains. This is part of the design phase.

In 604, an initial set of nominal power supply voltages for the set of power-domains is selected by a circuit controller (e.g. circuit logic, a microcontroller or a computer).

In 606, a circuit profiler (e.g. circuit logic, a microcontroller or a computer) estimates or computes values for the operating parameters Tcritical, Itotal, IA (first power-domain (e.g. A) current) and IB (second power-domain (e.g. B) current). Note, Tcritical=TA+TB, where TA is the delay time for the first power-domain and TB is the delay time for the second power-domain.

The operating parameters can be estimated using Eqns. 8 through 13 above. Such an estimate is acceptable since in one example only proportionally reliable numbers are necessary for computing the initial system parameters. For example, an estimate such as TA=0.6*Tcritical and IA=0.3*Itotal at an initial value of VDDA, VDDB is acceptable.

If an estimate is not possible, then the operating parameter values are computed as discussed instruction 406 of FIG. 4. The estimate may require inserting few different VDDs to create linear equations. If the available infrastructure (like timing libraries not available then another alternative is to just compute (simulation of critical path or refer to design timing reports generated by the EDA tools.

In 608, the values of at least one of the operating parameter (e.g. VDDA of the first power-domain) are incrementally swept over a range of voltages (e.g. 0V up to the first power-domain's maximum operational voltage) using the circuit controller.

In 610, for each specific incremental VDDA voltage, operational parameter values for TA, TB, Tcritical, IA, IB, Itotal, and VDDB are derived using the circuit profiler. Note, during the design phase these parameter values are computed using Eqns. 8 through 13 using simulated versions of both power-domains. However during the operational phase these parameter values are derived in real-time using Eqns. 8 through 13 using actual measured signal values from both power-domain's actual hardware circuits.

In response to the VDDA increments, in 612 each set of operational parameter values are then compared with the prior set of operational parameter values. Iterations between instructions 608 and 612 are performed until the circuit is optimized by either minimizing total circuit power consumption (i.e. Itotal), minimizing Tcritical, or minimizing some combination of both.

In 614, Tcritical, Itotal, IA and IB are validated so that the loop does not iterate infinitely. However in example embodiments, iteration is continued if the resulting power consumption is less than the previous one. When power consumption starts increasing, a few (e.g. three) more iterations can be performed to filter out the effect of noise, and ensure that the minima is reached in a reliable manner.

Next in 616 at the design phase, the EDA design software checks whether there is another possible set of level-shifter (LS) locations.

If another set of level-shifter locations is possible, in 618 the level-shifters are logically moved using EDA design tools to such other location and instructions 604, 606, 608, 610 and 612 are repeated.

If in 616 there are no other possible set of level-shifter locations, then in 620 the set of level-shifter positions corresponding to either a lowest total circuit power consumption, a lowest Tcritical, or some combination of both is selected.

In 622 a final set of nominal power supply voltages are assigned to the set of power-domains corresponding to the selected set of level-shifter positions by the circuit controller.

Thus in view of the discussion above, by using Eqns. 8 and 11 a less computationally intense and costly approach than that used with infrastructure components (e.g. libraries containing timing and power information) is achieved. Due to this more streamlined approach a wider range of design choices can be tested both during the design phase and implemented in real-time during the operational phase.

Figure 7A:
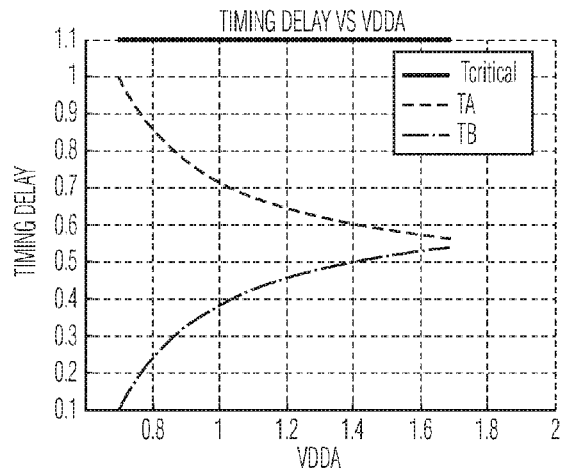
FIGS. 7A, 7B and 7C show a first example set of EDA design simulation results for flat and stacked power-domain circuits.
Figure 7B:
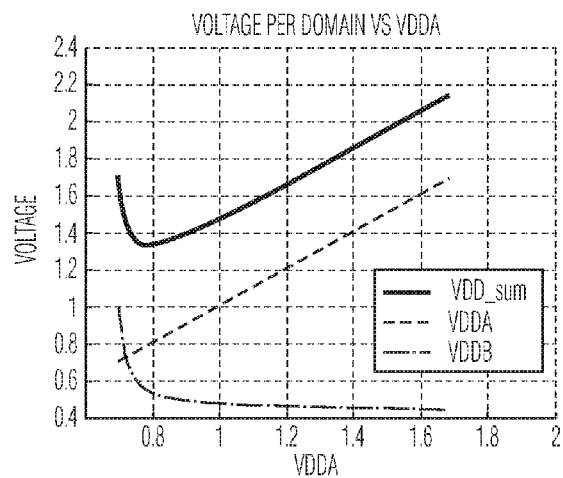
Figure 7C:
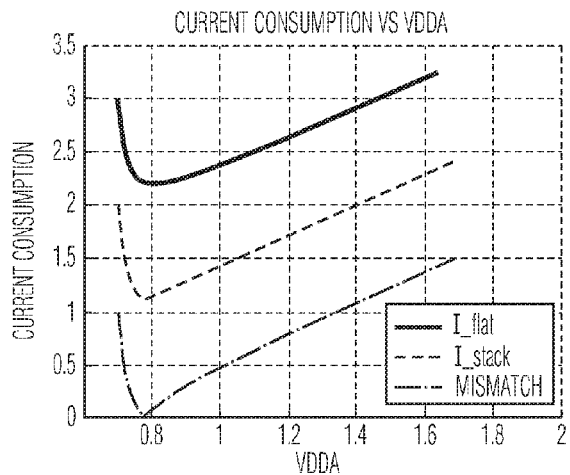

FIGS. 7A, 7B and 7C show a first example set of EDA design simulation results for flat and stacked power-domain circuits. In this first example set, the flat or stacked circuit's operating conditions are initialized to as set of currents and voltages (e.g. IA0=1; IB0=2; VDDA0=0.7; VDDB0=1; Vth=0.4; TA0=1; and TB0=0.1).

Power-Domain-A's voltage (VDDA0) is then swept from 0V to about 1.7V, while the total delay time of both power-domains is kept constant (i.e. Tcritical=1.1).

FIG. 7A shows an example graph of the effect of a VDDA voltage sweep on both power-domain's timing delay (i.e. TA, TB).

FIG. 7B shows an example graph of the effect of a VDDA voltage sweep on power-domain B's voltage (VDDB).

FIG. 7C shows an example graph of the effect of a VDDA voltage sweep on the current consumption (Itotal) for both a flat and stacked set of power-domains. In FIG. 7C, clear minimums in the total current consumption curves, for a given Ttotal, are visible. Total circuit power consumption can then be derived (i.e. Power=Itotal*VDDtotal).

Figure 8A:
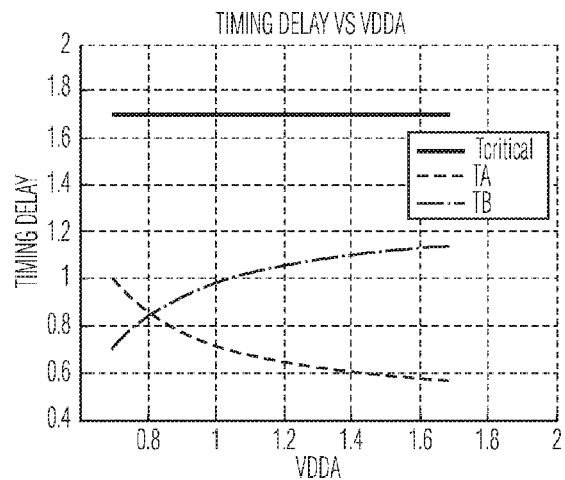
FIGS. 8A, 8B and 8C show a second example set of EDA design simulation results for flat and stacked power-domain circuits.
Figure 8B:
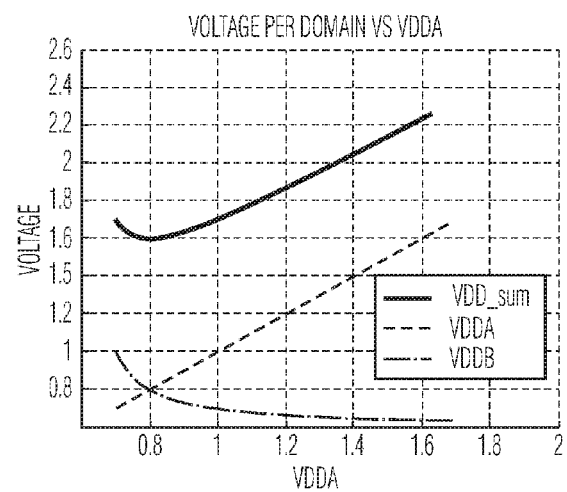
Figure 8C:
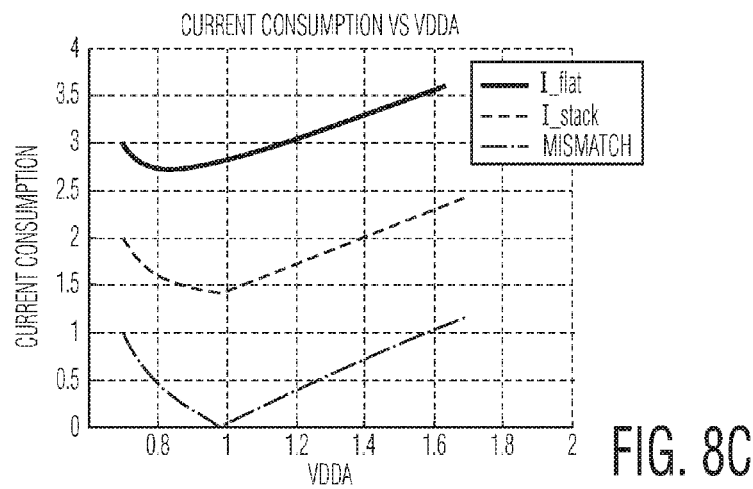

FIGS. 8A, 8B and 8C show a second example set of EDA design simulation results for flat and stacked power-domain circuits. In the second example set, the flat or stacked circuit's operating conditions are initialized to as set of currents and voltages (e.g. IA0=1; IB0=2; VDDA0=0.7; VDDB0=1; Vth=0.4; TA0=1; and TB0=0.7).

Power-Domain-A's voltage (VDDA0) is then again swept from 0V to about 1.7V, while the total delay time of both power-domains is kept constant (i.e. Tcritical=1.7).

FIG. 8A shows an example graph of the effect of a VDDA voltage sweep on both power-domain's timing delay (i.e. TA, TB).

FIG. 8B shows an example graph of the effect of a VDDA voltage sweep on power-domain B's voltage (VDDB).

FIG. 8C shows an example graph of the effect of a VDDA voltage sweep on the current consumption (Itotal) for both a flat and stacked set of power-domains. Again, in FIG. 8C, clear minimums in the total current consumption curves, for a given Ttotal, are visible.

A comparison between FIGS. 7 and 8 indicate that for both Tcritical and Itotal to be minimized VDDA should initially be about 0.7V and VDDB be about 1V, for either flat or stacked power-domain circuit designs.

During real-time dynamic circuit operation, a similar VDDA voltage sweeping routine may be used to characterize the circuit and similarly select specific VDDA and VDDB values in real-time response to changes in each power-domain's task/logic/software loading. Such voltage scaling adaptation functionality during design-time and run-time, optimally maintains low power consumption in the circuit.

One example application of the previously presented design phase and operational phase steps is now discussed with respect to a MoTL stacked memory on top of logic design.

First, the overall circuit design is cleanly partitioned such that the level-shifters remain within their operating limits (e.g. power consumption and silicon area overhead) and such each power-domain has similar power consumption requirements for range of task, logic or software applications.

Note that if the circuit design is partitioned into power-domains which are non-interacting (i.e. which do not exchange signals), then level-shifting is either not required or very minimally required.

However, if the circuit design is partitioned into power-domains which are interacting (e.g. such as a MoTL design) then level-shifters are required.

A well chosen set of power-domain partitions simplifies overhead calculations performed during the real-time operational phase of power-domain optimization.

Second. The partitioning creates a set of power-domains having different power consumption levels.

A generic microcontroller design consumes more power in the CPU power-domain during dynamic operations, while in standby mode, the memory power-domain consumes more power, since most of the CPU logic can be powered-off.

In an example Internet of Things (TOT) circuit design application using a microcontroller unit (MCU), a memory consumes about 30-40% power while microcontroller logic consumes 60-70% of the power, when both power-domains are operating at the same voltage (e.g. 1V for 40 nm technology). At a same time, critical path delay can be between the CPU and the SRAM, where, logic is responsible for 30-40% of critical delay and memory is 60-70%. For example, for a 100 MHz MCU design (10 ns timing/clock period) and with memory speed (~130 MHz in C40).

Third. Next VDDA for the CPU/MCU/logic is reduced, while the SRAM/memory is kept at 1V. This causes the CPU/MCU/logic timing delay to increase but does reduce power consumption. So as not to make the overall circuit design slower, VDDB for the SRAM/memory power-domain is increased, which reduces timing delay in the SRAM/memory power-domain.

While the examples above have described a voltage scaling application, similar techniques can be applied to substrate biasing.

Figure 9:
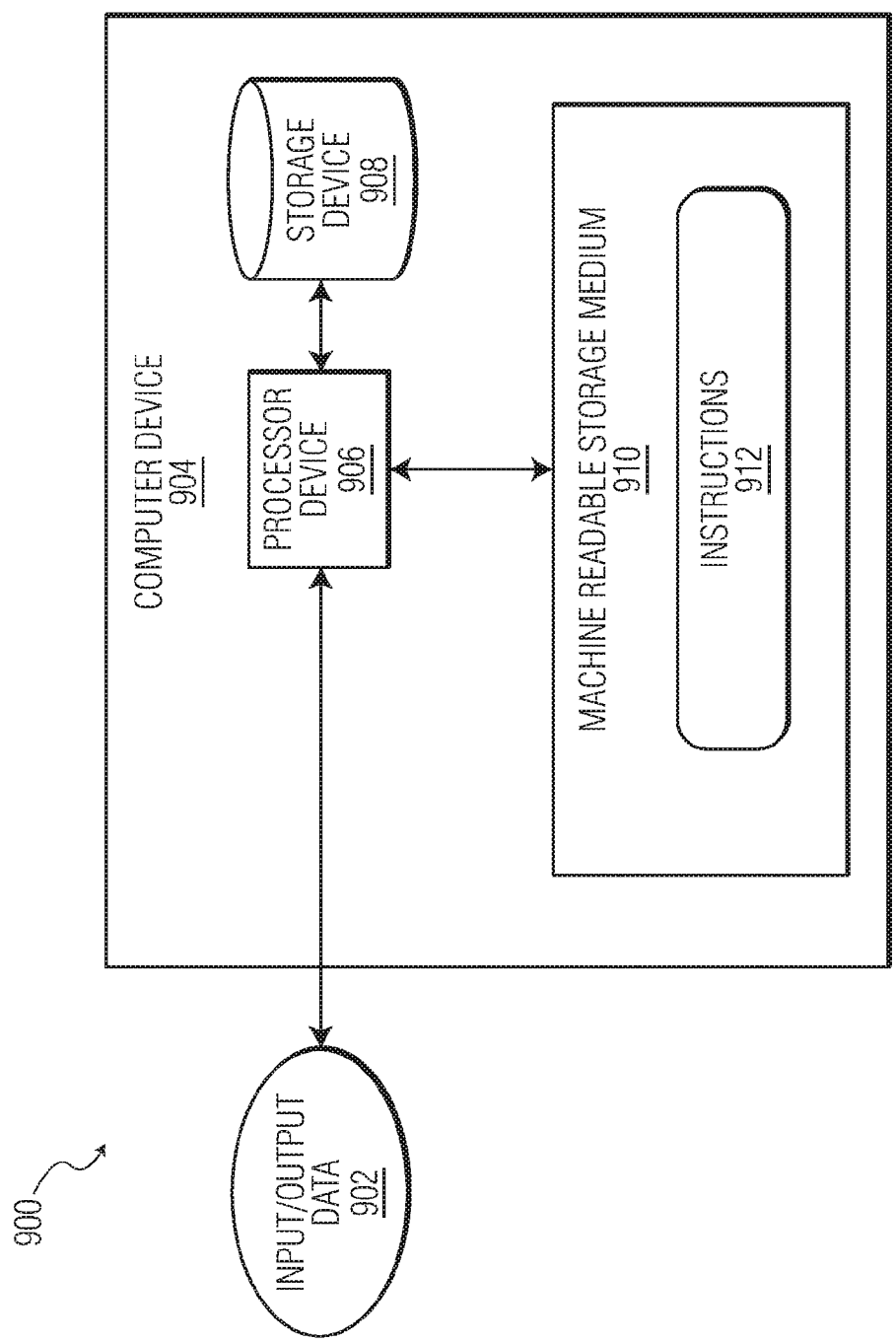
FIG. 9 is an example system for hosting instructions for enabling a power-domain optimization apparatus.

FIG. 9 is example system 900 for hosting instructions for enabling a power-domain optimization apparatus. The system 900 shows an input/output data 902 interface with a computing device 904 (e.g. a controller). The computing device 904 includes a processor device 906, a storage device 908, and a machine-readable storage medium 910. Instructions 912 within the machine-readable storage medium 910 control how the processor 906 interprets and transforms the input data 902, using data within the storage device 908. The machine-readable storage medium in an alternate example embodiment is a computer-readable storage medium.

Various example sets of instructions stored in the machine-readable storage medium 910 include those shown in FIGS. 4, 5 and 6.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions described above are implemented as functional and software instructions embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An apparatus for power management, comprising:
a circuit having a first power-domain and a second power-domain;
wherein the first and second power-domains include a set of operating parameter values;
a circuit controller configured to incrementally sweep at least one of the operating parameter values of the first power-domain; and
a circuit profiler configured to derive a total power consumption profile of the circuit based on the circuit's response to the swept operating parameter value;
wherein the circuit controller sets the operating parameter values for the first and second power-domains based on the total power consumption profile of the circuit.

2. The apparatus of claim 1:
wherein the set of operating parameters include at least one of: an operating voltage, an operating current, an operating delay time, an operating frequency or an operating task.

3. The apparatus of claim 2:
wherein the circuit controller sets the operating voltage values for the first and second power-domains to minimize at least one of: a total circuit current, the total power consumption of the circuit or a total circuit delay.

4. The apparatus of claim 1:
wherein the incremental sweep is performed in real-time during circuit operation.

5. The apparatus of claim 1:
wherein the power-domains are configured in at least one of: a flat configuration or a stacked configuration.

6. The apparatus of claim 1:
wherein the circuit controller is an adaptive-relative-voltage-frequency-scaling (ARVFS) controller.

7. The apparatus of claim 1:
wherein VDDA is an operating voltage and IA is an operating current for the first power-domain;
wherein VDDB is an operating voltage and I3 is an operating current for the second power-domain;
wherein k1=IA/VDDA, k2=IB/VDDB; and
wherein the circuit profiler configured to derive the total power consumption profile based on equation: I-total=k1*VDDA+k2*VDDB.

8. The apparatus of claim 1:
wherein the circuit profiler configured to derive a total timing delay profile of the circuit based on the circuit's response to the incremental sweep of the operating parameter value; and
wherein the circuit controller also sets the operating parameter values for the first and second power-domains based on the total timing delay profile of the circuit.

9. The apparatus of claim 8:
wherein VDDA is an operating voltage for the first power-domain, and VDDB is an operating voltage for the second power-domain;
wherein TA is an operating delay time for the first power-domain and TB is an operating delay time for the second power-domain;
wherein Vth is a threshold voltage and '$\alpha$' is velocity saturation index;
wherein $m1=TA*(VDDA-Vth)^\alpha/VDDA$, and $m2=TB*(VDDB-Vth)^\alpha/VDDB$; and
wherein the circuit profiler configured to derive the total timing delay profile based on equation: $Tcritical=m1*VDDA/(VDDA-Vth)^\alpha+m2*VDDB/(VDDB-Vth)^\alpha$.

10. The apparatus of claim 1:
further comprising a set of level-shifters for translating a set of signals exchanged between the first power-domain and the second power-domain;
wherein the circuit controller positions the level-shifters at a first set of locations in the circuit;
wherein the circuit profiler is configured to derive a first total power consumption profile of the circuit with the set of level-shifters positioned at the first set of locations;
wherein the circuit controller positions the level-shifters at a second set of locations in the circuit;
wherein the circuit profiler is configured to derive a second total power consumption profile of the circuit with the set of level-shifters positioned at the second set of locations; and
wherein the circuit controller the set of level-shifter locations based on the total power consumption profile of the circuit.

11. The apparatus of claim 10:
wherein the circuit controller the set of level-shifter locations such that the total power consumption of the circuit is minimized.

12. A method for power management in a circuit having a first power-domain and a second power-domain, wherein the first and second power-domains include a set of operating parameter values, the method comprising:
incrementally sweep at least one of the operating parameter values of the first power-domain;
deriving a total power consumption profile of the circuit based on the circuit's response to the swept operating parameter value; and
setting the operating parameter values for the first and second power-domains based on the total power consumption profile of the circuit.

13. An article of manufacture including at least one non-transitory, tangible machine readable storage medium containing executable machine instructions for power management, comprising:
wherein the article includes,
a circuit having a first power-domain and a second power-domain;
wherein the first and second power-domains include a set of operating parameter values;
wherein the instructions include,
incrementally sweep at least one of the operating parameter values of the first power-domain;

deriving a total power consumption profile of the circuit based on the circuit's response to the swept operating parameter value; and setting the operating parameter values for the first and second power-domains based on the total power consumption profile of the circuit.

\* \* \* \* \*